(12) United States Patent
Romero et al.

(10) Patent No.: US 8,288,699 B2
(45) Date of Patent: Oct. 16, 2012

(54) MULTIPLATFORM SYSTEM AND METHOD FOR RANGING CORRECTION USING SPREAD SPECTRUM RANGING WAVEFORMS OVER A NETTED DATA LINK

(75) Inventors: Ric A. Romero, Tucson, AZ (US); Michael S. Bielas, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 930 days.

(21) Appl. No.: 12/263,611

(22) Filed: Nov. 3, 2008

(65) Prior Publication Data

US 2011/0224903 A1    Sep. 15, 2011

(51) Int. Cl.
*F42B 15/01* (2006.01)
*F42B 15/10* (2006.01)
*F42B 15/00* (2006.01)

(52) U.S. Cl. ......... 244/3.15; 244/3.1; 89/1.11; 701/300; 701/301; 375/130; 375/140

(58) Field of Classification Search .......... 701/1, 23–28, 701/200, 300, 301; 244/3.1–3.19; 375/130–153; 342/29–58, 70–72, 175, 195, 450–465, 60–65, 342/118, 145–147
See application file for complete search history.

(56) References Cited

U.S. PATENT DOCUMENTS

| | | | |
|---|---|---|---|
| 5,073,900 A * | 12/1991 | Mallinckrodt | 375/130 |
| 6,038,502 A * | 3/2000 | Sudo | 701/23 |
| 6,842,674 B2 * | 1/2005 | Solomon | 701/23 |
| 7,039,367 B1 * | 5/2006 | Kucik | 244/3.11 |
| 7,233,859 B2 * | 6/2007 | Lundberg | 701/200 |
| 7,269,513 B2 * | 9/2007 | Herwitz | 701/301 |
| 7,494,090 B2 * | 2/2009 | Leal et al. | 244/3.16 |
| 7,631,833 B1 * | 12/2009 | Ghaleb et al. | 244/3.15 |
| 7,675,012 B1 * | 3/2010 | Bobinchak et al. | 244/3.15 |
| 7,734,386 B2 * | 6/2010 | DelNero et al. | 701/23 |
| 7,737,878 B2 * | 6/2010 | van Tooren et al. | 342/29 |
| 7,947,936 B1 * | 5/2011 | Bobinchak et al. | 244/3.15 |
| 7,952,522 B2 * | 5/2011 | Hohl | 342/463 |
| 8,005,486 B2 * | 8/2011 | Pahlavan et al. | 342/450 |

* cited by examiner

*Primary Examiner* — Bernarr Gregory
(74) *Attorney, Agent, or Firm* — Schwegman Lundberg & Woessner, P.A.; Gregory J. Gorrie

(57) ABSTRACT

Embodiments of a multiplatform system and method for ranging correction use spread-spectrum ranging waveforms over a netted data link. Each node may have a trajectory toward a target and may have a navigational error with respect to the trajectory. The nodes may transmit coded waveforms at one or more scheduled times for receipt by one or more of the other nodes during unused time slots on the netted data link. The nodes may correlate coded waveforms received from the other nodes to estimate a range to at least some of the other nodes. Each node may reset its navigational error and revise its trajectory based on the range estimates to the other nodes to avoid a possible collision with one or more of the other nodes.

29 Claims, 3 Drawing Sheets

MULTIPLATFORM SYSTEM AND METHOD FOR RANGING CORRECTION USING SPREAD SPECTRUM RANGING WAVEFORMS OVER A NETTED DATA LINK

TECHNICAL FIELD

Some embodiments pertain to multiplatform systems. Some embodiments pertain to multiplatform systems that comprise networked nodes that communicate over a netted data link. Some embodiments pertain to airborne systems, such as systems of missiles and missile networks. Some embodiments pertain to multi-vehicle systems.

BACKGROUND

Multiplatform systems may include a large number of vehicles that may be launched toward a common target. Due to inherent navigational errors, there is a possibility of collision between some of the vehicles. Each vehicle's internal navigational system has a navigational error that may increase over time due to, among other things, free-inertial navigational position drift. Improved navigational systems with reduced navigational errors do not effectively eliminate the possibility of a collision between vehicles because vehicle-to-vehicle range estimates are not updated or corrected. The use of Global Positional Systems (GPS) may help reduce this problem, but GPS signals are not always readily available, require significant processing, and require system-level coordination to resolve vehicle-to-vehicle range.

Thus, what are needed are systems and methods that help resolve the unknown vehicle-to-vehicle range in a multiplatform system. What are also needed are systems and methods that help reduce the possibility of collisions between multiple vehicles that are launched toward a common target. What are also needed are multiplatform systems and methods that can help reduce a vehicle's navigational error.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
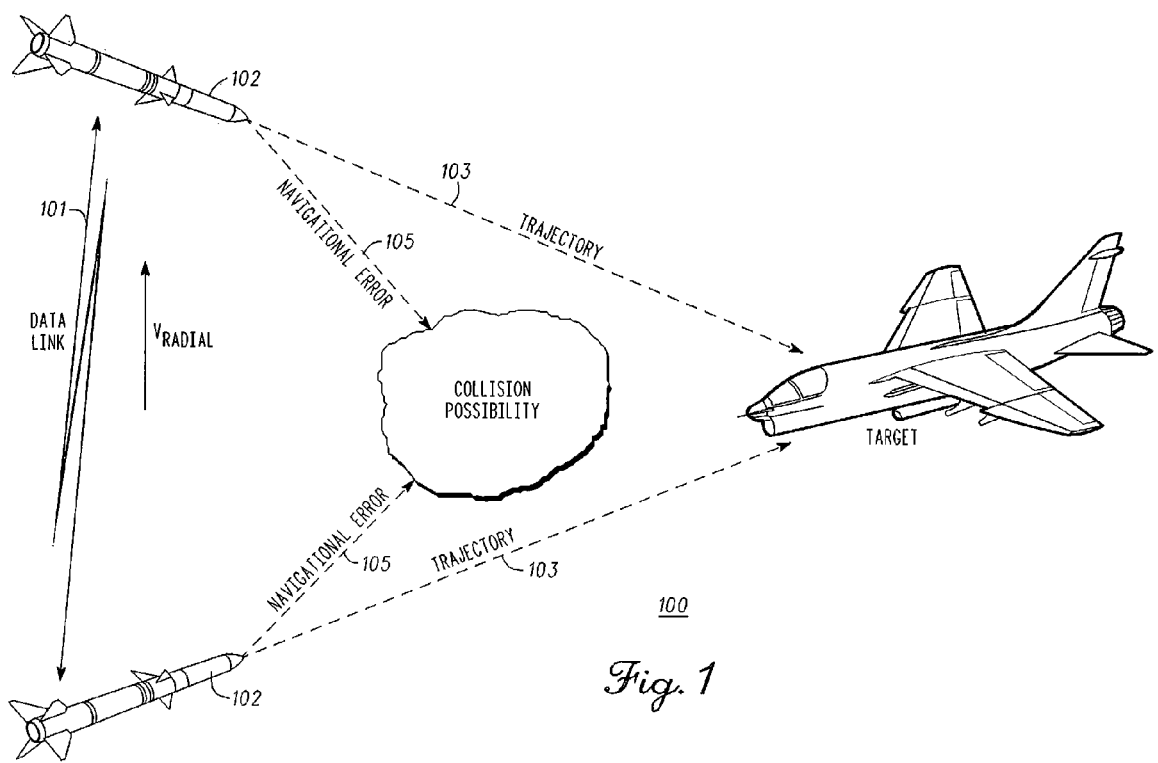
FIG. 1 illustrates the operational environment of a multiplatform system in accordance with some embodiments.

FIG. 1 illustrates the operational environment of a multiplatform system in accordance with some embodiments. Multiplatform system 100 comprises a plurality of networked nodes 102 that communicate over netted data link 101. Each node 102 may have trajectory 103 toward target 106. Each node 102 may also have a navigational error 105 with respect to trajectory 103. Multiplatform system 100 may include a master node (not separately illustrated) which may manage and coordinate communications and the timing on netted data link 101 among nodes 102. The master node may be one of nodes 102 or may be an aircraft from which nodes 102 may have been launched. The master node may also be ground station, although the scope of the embodiments is not limited in this respect. In some embodiments, nodes 102 may communicate using packetized communications over netted data link 101. The communications may be spread-spectrum communications (e.g., using CDMA or a frequency hopping technique) or the communications may be within one or more channels within a predetermined frequency spectrum.

Nodes 102 may comprise almost any type of payload or vehicle. In some embodiments, nodes 102 may comprise almost any type of missile or guided projectile. Although only two nodes 102 are illustrated in FIG. 1, the number of nodes 102 in multiplatform system 100 may range from as few as two to as great as 50 or more.

In accordance with embodiments, nodes 102 are configured to transmit and receive coded waveforms to help resolve the unknown node-to-node range. The coded waveforms may also be used to help reduce the possibility of collisions between nodes 102. The coded waveforms may also be used to help reduce the navigational errors of nodes 102.

In accordance with some embodiments, at least some nodes 102 are configured to transmit a coded waveform at one or more scheduled times for receipt by other nodes 102. Nodes 102 may also correlate coded waveforms received from other nodes 102 to estimate a range to at least some other nodes 102. At least some nodes 102 may be configured to reset their navigational error 105 and revise their trajectory 103 based on the range estimates to other nodes 102 to avoid a possible collision with one or more other nodes 102.

In these embodiments, a possible collision with another node 102 may occur when navigational errors 105 of two or more of nodes 102 overlap. Navigational errors 105 may be represented by an uncertainty region defined by navigational error 105 around trajectory 103. This uncertainty region may be viewed as the volume of a cone. At a given time due to navigational error 105, the position of a node 102 is only known to be within the uncertainty region defined by navigation error 105. Over time navigation error 105 of each node 102 increases due to, among other things, the free-inertial unaided navigational drift. Increased navigational error 105 increases the size of the uncertainty region. When the uncertainty regions intersect, there is a possibility of a collision between nodes 102 that have intersecting uncertainty regions.

In some embodiments, the scheduled times for the transmission of coded waveforms may occur during unused timeslots or time periods on netted data link 101. Each node 102 may include timing and scheduling circuitry configured to, among other things, schedule transmissions of coded waveforms at the one or more scheduled times during the unused time-slots.

In some embodiments, at least some of nodes 102 may select a transmission schedule that provides an amount of overlap between the coded waveform transmissions by nodes 102. The transmission schedule may include a same-time transmission schedule that provides substantially full overlap of the coded waveform transmissions, a partial overlapping transmission schedule that provides a partial overlap of the coded waveform transmissions, or a sequential transmission schedule that provides substantially no overlap of the coded waveform transmissions. A partial overlap transmission schedule may be selected when the amount of overlap desired is between full overlap and no overlap.

In accordance with the same-time transmission schedule, each node 102 may transmit a unique coded waveform at substantially the same time that other nodes 102 transmit their unique coded waveforms providing full overlap of the coded waveform transmissions. In accordance with the sequential transmission schedule, each node 102 may transmit its unique coded waveform at times that do not overlap with the coded waveform transmissions of other nodes 102.

In some alternate embodiments, rather than each node 102 selecting the transmission schedule, the transmission schedule may be preselected by multiplatform system 100 or the master node, although the scope of the embodiments is not limited in this respect. In some embodiments, the transmission schedule may be selected based on a number of nodes 102 operating within multiplatform system 100 and the length of the available time of unused time-slots on netted data link 101. In some embodiments, transmission schedule may also be selected based on a code length of a family of codes to be used to generate the coded waveforms.

In some embodiments, a transmission schedule may be selected to provide a lesser amount of overlap between the coded waveforms transmitted by nodes 102 when the number of nodes 102 is greater. A transmission schedule may be selected to provide a greater amount of overlap between the coded waveforms transmitted by nodes 102 when the number of nodes 102 is lower. In these embodiments, the greater the number of nodes 102, the more difficult it may be to correlate their transmissions with increased overlap. The less the number of nodes 102, the easier it may be to correlate transmissions that overlap. In some embodiments, when coded waveforms are transmitted at overlapping times, longer codes may be used to improve each node's ability to correlate. When the coded waveforms are transmitted with less overlap, correlation may be achieved with shorter codes.

In some embodiments, a family of codes having shorter lengths may be preselected by multiplatform system 100 when there are a lesser number of nodes 102. A family of codes having longer lengths may be selected when multiplatform system 100 includes a greater number of nodes. In these embodiments, the family of codes may be pre-selected by multiplatform system 100 prior to launch. In these embodiments, when there is a greater the number of nodes, longer code lengths may make it easier to correlate the coded waveform transmissions, and accordingly, when there are a lesser number of nodes 102, shorter code lengths may be used. In some embodiments, each node 102 may be provided information that includes the number of nodes and an indicator to allow the proper family of codes to be selected. Each node 102 may either generate the codes of the indicated family using a common algorithm, or may look-up the indicated family of codes from a table stored in a memory structure of a node 102.

In some embodiments, the amount of overlap in a transmission schedule may be selected based on the channel quality. The channel quality may be determined based on the communications over the links of netted data link 101. In these embodiments, a transmission schedule with increased overlap may be selected during better channel quality (e.g., greater SNR) conditions and a transmission schedule with decreased overlap may be selected during poorer channel quality (e.g., lower SNR) conditions, although the scope of the embodiments is not limited in this respect.

Timing and scheduling circuitry of each node 102 may be configured to schedule the transmission of a coded waveform in accordance with the selected transmission schedule. Based on the number of nodes 102, a node identifier of the current node, and the waveform family identifier, each node 102 may determine which code to use for generating a coded waveform for transmission, as well as which codes to use for correlating received coded waveform transmissions from the other nodes 102. In some embodiments, each node 102 may be provided an indicator over netted data link 101 from the master node to indicate the particular transmission schedule to select, although the scope of the embodiments is not limited in this respect.

In some embodiments, each node 102 may also revise its trajectory 103 toward target 106 based on the range estimates to the other nodes 102. In these embodiments, each node 102 may be position-aware. A navigational unit of each node 102 may be configured to update the node's coordinates with respect a common reference. In these embodiments, each node 102 may re-target itself toward target 106 based on the range estimates to the other nodes 102. The navigational error of each navigational unit, which would otherwise increase over time, may be reduced or reset to a smaller value based on a node's range estimates to at least some of the other nodes 102.

Programmable simultaneous processing of received coded waveforms may enable nodes 102 to estimate the range to each other to allow a true node-to-node deconfliction to be achieved. When a node 102 is out of range of another node, there would be no need to deconflict. In these embodiments, coded waveforms can be correlated even during low SNR conditions and at long ranges allowing accurate range estimates to be achieved.

In some embodiments, the timing and scheduling circuitry of each node 102 may include a clock. The clocks of nodes 102 may be synchronized prior to launch to provide for transmission of the coded waveforms at the scheduled times in accordance with the selected transmission schedule. In some embodiments, in addition to the use of synchronized clocks, each node 102 may take into account Doppler and processing time to accurately determine node-to-node range. In some embodiments, a node 102 may execute a request for a navigation uplink over netted data link 101.

In some embodiments, the codes used to generate the coded waveforms may comprise pseudo-random codes of a family of related codes. In some embodiments, the codes of a family may have minimum cross correlation properties between any two codes of a family. In some embodiments, pseudo-random noise (PN) codes may be used. In some embodiments, the codes may be algebraically related and may include Gold codes or Walsh codes, although the scope of the embodiments is not limited in this respect. The use of coded waveforms spreads the transmission over the spectrum. In these embodiments, the coded waveforms may comprise spread-spectrum ranging waveforms.

In some embodiments, coded waveforms may be transmitted with a transmission security (transec) cover, such as a pseudo-random transec cover. The transec cover may be applied at transmission and then removed at reception. In some embodiments, the transec cover may comprise a transec sequence (e.g., another pseudo-random sequence) that is XOR'ed with the selected code. At the receiver, the transec cover may be removed by similarly XOR'ing the transec sequence with the received sequences. In some embodiments, a code generator may be clocked simultaneously by nodes 102 at a given time interval, for example, based on time of day, and/or at predetermined intervals (e.g., 1 second intervals). In some embodiments, the starting point of the code generator may be based on a key initially provided to nodes 102, although the scope of the embodiments is not limited in this respect.

In some embodiments, the coded waveforms may be transmitted by nodes 102 at each of a plurality of scheduled times to allow each node 102 to revise its trajectory 103 and reset its navigational error 105 on a regular basis. In some embodiments, a new set of codes of a selected family of codes may be used to generate the coded waveforms for transmissions during each regularly scheduled time. The use of these different code sets at each regularly scheduled time may provide anti-jamming benefits, although the scope of the embodiments is not limit in this respect.

In some embodiments, netted data link 101 may comprise a mesh type network of data links established between nodes 102 to communicate data and telemetry with the master node. Each of nodes 102 may communicate within designated time slots of netted data link 101. Nodes 102 may transmit their coded waveforms in accordance with times that are scheduled during unused time slots of netted data link 101 (i.e., when netted data link 101 is available or not being used). In some embodiments, netted data link 101 may be used for in-flight retargeting, hit indications, target handover and in-flight programmability. The use of netted data link 101 may help provide a capability to destroy critical time-sensitive and moving targets in all weather conditions.

Figure 2:
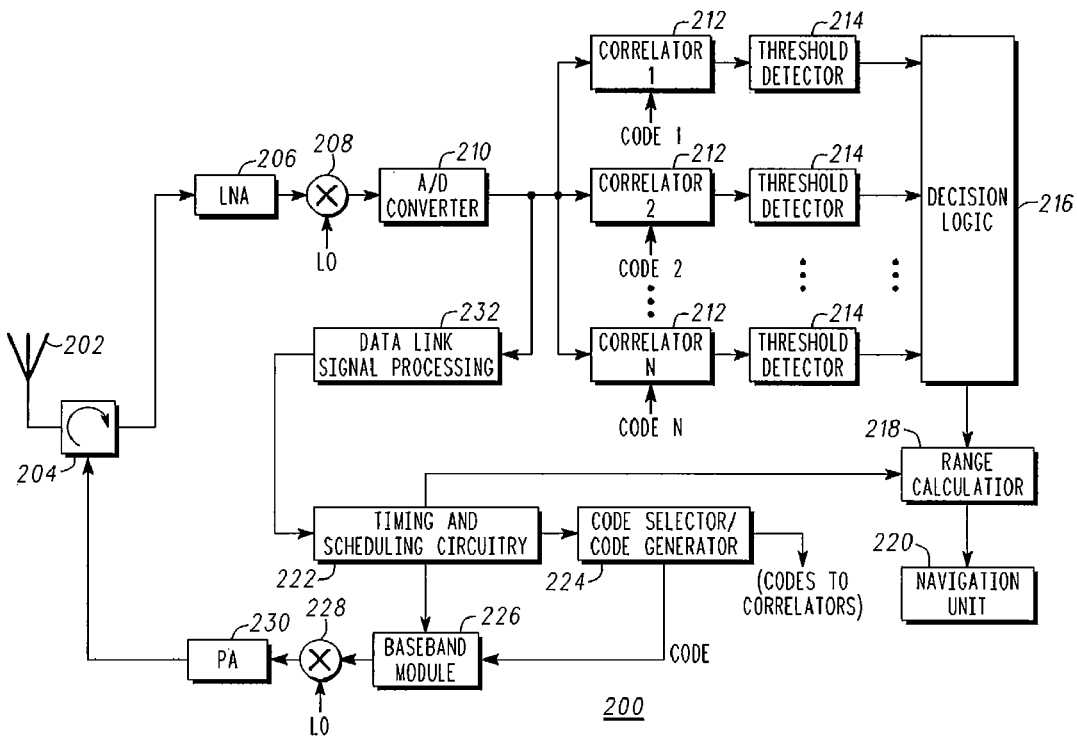
FIG. 2 is a functional block diagram of a node suitable for use in a multiplatform system in accordance with some embodiments.

FIG. 2 is a functional block diagram of a node suitable for use in the multiplatform system in accordance with some embodiments. Node 200 may be suitable for use for one or more of nodes 102 (FIG. 1). Node 200 may comprise one or more antennas 202 for transmission and reception of signals, and circular 204 to separate signals for transmission from signals for reception. Node 200 may also include low-noise amplifier (LNA) 206 to amplify received signals and downconverter 208 to downconvert received signals to baseband. Node 200 may also include analog-to-digital (A/D) converter 210 to generate sampled baseband digital signals. Node 200 may also include data link signal processing circuitry 232 to process information signals received over netted data link 101 (FIG. 1).

Node 200 may also include timing and scheduling circuitry 222 to schedule transmissions of coded waveforms at one or more scheduled times for receipt by one or more of the other nodes, as discussed above. Node 200 may also include a parallel receiver to receive coded waveforms that were transmitted by one or more other nodes. The parallel receiver may include a plurality of parallel correlators 212 to correlate coded waveforms received from the other nodes. Correlators 212 may operate on coded waveforms after converted to sampled baseband digital signals. Node 200 may include threshold detectors 214 to identify correlation peaks generated by correlators 212 when a received code is correlated. In some embodiments, one correlator 212 and associated threshold detector 214 may be provided for each node 102 (FIG. 1) in multiplatform system 100 (FIG. 1).

Node 200 may also include decision logic 216 to provide timing information associated with the correlation detected by threshold detectors 214. Node 200 may also include range calculator 218 to estimate a range to at least some of the other nodes based on the detected correlations. In these embodiments, range calculator 218 may determine range estimates to other nodes based on a correlation time with respect to a scheduled transmission. Timing information associated with the scheduled transmissions may be provided by timing and scheduling circuitry 222. In these embodiments, the range estimates may be determined by considering hardware processing delays, among other things.

Node 200 may also include navigational unit 220 to reset the node's navigational error based on the range estimates to the other nodes. Navigational unit 220 may also revise the node's trajectory to avoid a possible collision with one or more of the other nodes. Navigational unit 220 may also be response to navigational commands received over netted data link 101 (FIG. 1) and processed by data link signal processing circuitry 232.

In some embodiments, node 200 may include code selector 224 to select codes to provide to each of correlators 212. The codes may be available for selection by code selector 224 from a look-up-table (LUT). In some alternate embodiments, code selector 224 may include a code generator to generate the codes based on a predetermined algorithm or technique using a key. Timing and scheduling circuitry 222 may be configured to provide information to code selector 224 to allow code selector 224 to generate and/or provide the proper codes to each of correlators 212.

Node 200 may also include baseband modulator 226 to modulate a code provided by code selector 224 at one or more times indicated by timing and scheduling circuitry 222. Timing and scheduling circuitry 222 may be configured to provide information to code selector 224 to allow code selector 224 to generate and/or provide the proper code associated with node 200 to baseband modulator 226. In some embodiments, baseband modulator 226 may phase modulate the selected code to generate a coded waveform at baseband for upconversion and transmission at the one or more scheduled times. In other embodiments, baseband modulator 226 may frequency modulate the selected code to generate a coded waveform at baseband for upconversion and transmission at the one or more scheduled times.

Node 200 may also include up-converter 228 to up-convert the baseband signal provided by baseband modulator 226, and power amplifier (PA) 230 to amplify signals from transmission by one or more antennas 202. Information signals for transmission on netted data link 101 (FIG. 1) may be provided by data link signal processing circuitry 232 through timing and scheduling circuitry 222 for modulation, upconversion and transmission during scheduled time slots. As discussed above, timing and scheduling circuitry 222 may be configured to schedule transmission of the coded waveform at the one or more scheduled times during the unused time-slots on netted data link 101 (FIG. 1) in accordance with the selected transmission schedule.

In some embodiments, each node 102 (FIG. 1) of multiplatform system 100 (FIG. 1) may be configured to select the same transmission schedule. The transmission schedule may be selected to provide an amount of overlap between the coded waveforms transmitted by nodes 102 ranging from a same-time transmission schedule that provides substantially full overlap of the coded waveform transmissions, to a partial overlapping transmission schedule that provides a partial overlap of the coded waveform transmissions, to a sequential transmission schedule that provides substantially no overlap of the coded waveform transmissions.

Although node 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of node 200 may refer to one or more processes operating on one or more processing elements.

Figure 3:
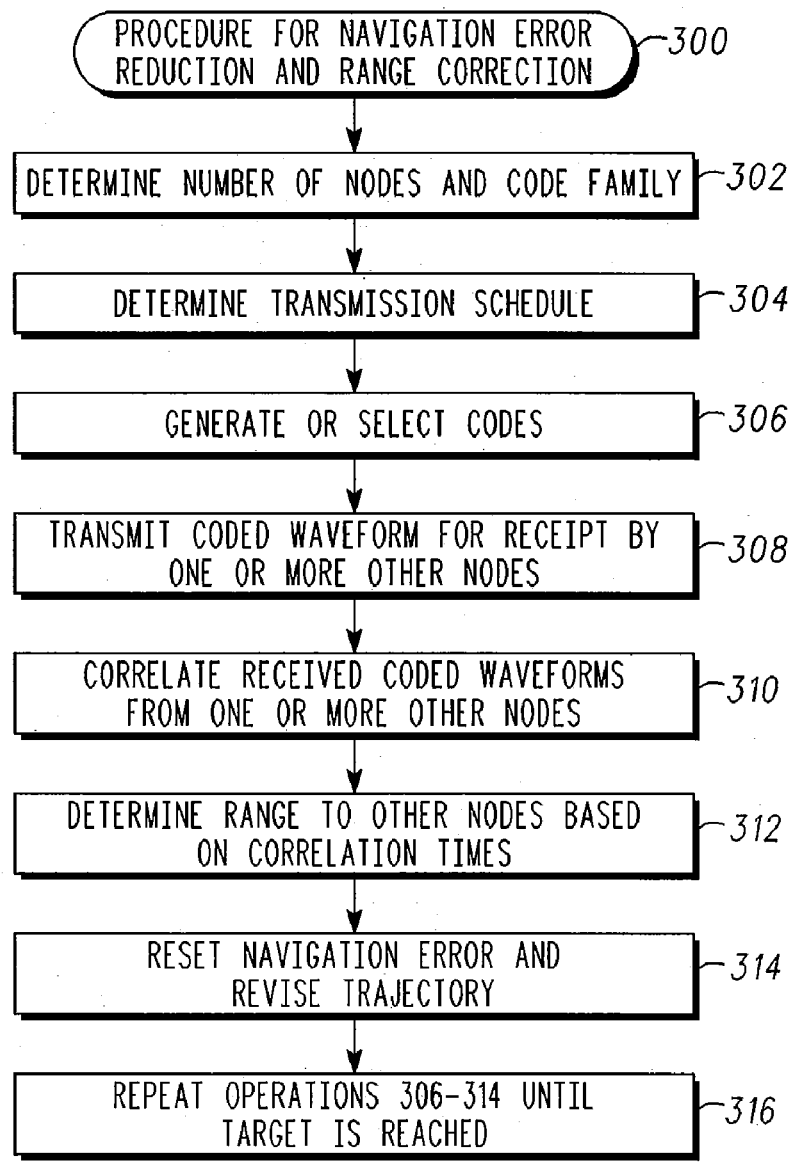
FIG. 3 is a flow chart of a procedure for navigational error reduction and range correction in accordance with some embodiments.

FIG. 3 is a flow chart of a procedure for navigational error reduction and range correction in accordance with some embodiments. Procedure 300 may be performed by any one or more of nodes 102 (FIG. 1) including the master node. Some operations may be performed at the master node or at a launch platform. Procedure 300 may be used by a node to reset its navigational errors and to revise its trajectory allowing, among other things, a collision with one or more other nodes to be avoided.

In operation 302, the number of nodes is determined and a code family may be selected. Operation 302 may be performed prior to launch of nodes 102 (FIG. 1) and the number of nodes and the selected code family may be programmed into each of nodes 102 (FIG. 1), although this is not a requirement. In other embodiments, the number of nodes and the selected code family may be provided to each of nodes 102 (FIG. 1) over netted data link 101 (FIG. 1) after launch.

In operation 304, the transmission schedule for transmission of the coded waveforms may be determined. The transmission schedule may be selected to provide an amount of overlap between the coded waveforms transmitted by nodes 102 (FIG. 1) as discussed above. All nodes may be configured to select the same transmission schedule. In some embodiments, the transmission schedule may be provided prior to launch, while in other embodiments, the transmission schedule may be provided after launch over netted data link 101 (FIG. 1).

In operation 306, the codes for use in generating a coded waveform for transmission and for use in correlating received coded waveforms may either be selected from a LUT or generated.

In operation 308, each node 102 (FIG. 1) may transmit its coded waveform for receipt by one or more other nodes in accordance with the transmission schedule determined in operation 304.

In operation 310, each node 102 (FIG. 1) may receive coded waveform transmissions from other nodes and may correlate the received coded waveforms using correlators 212 (FIG. 2).

In operation 312, each node 102 (FIG. 1) may determine a range to one or more of the other nodes based on the correlation times.

In operation 314, each node 102 (FIG. 1) may reset its navigational error based on the ranges determined in operation 312. Nodes 102 (FIG. 1) may also revise their trajectory to avoid a possible collision with one or more other nodes.

In operation 316, each node 102 (FIG. 1) may repeat operations 306 through 314 to reset its navigational error and revise its trajectory on a regular basis until a target is reached.

Although the individual operations of procedure 300 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multiplatform system comprising a plurality of networked nodes that communicate over a netted data link, wherein at least some of the nodes are configured to:
   transmit a coded waveform at one or more scheduled times for receipt by one or more of the other nodes;
   correlate coded waveforms received from the other nodes to estimate a range to at least some of the other nodes, each node having a trajectory toward a target and a navigational error with respect to the trajectory;
   revise the trajectory based on the range estimates to the other nodes to avoid a possible collision with one or more of the other nodes; and
   reset the navigational error with respect to the revised trajectory.

2. The multiplatform system of claim 1
   wherein the scheduled times are selected to occur during unused time-slots on the netted data link, and
   wherein each node includes timing and scheduling circuitry configured to schedule transmission of a coded waveform at the one or more scheduled times during the unused time-slots.

3. The multiplatform system of claim 2 wherein at least some of the nodes are further configured to select a transmission schedule for transmission of the coded waveforms, the transmission schedule to provide an amount of overlap between the coded waveforms transmitted by the nodes ranging from a same-time transmission schedule that provides full overlap of the coded waveform transmissions, to a partial overlapping transmission schedule that provides a partial overlap of the coded waveform transmissions, to a sequential transmission schedule that provides no overlap of the coded waveform transmissions.

4. The multiplatform system of claim 3 wherein the transmission schedule is selected based on a number of nodes of the plurality and a length of the unused time-slots on the netted data link.

5. The multiplatform system of claim 4 wherein the transmission schedule is further selected based on a code length of a family of codes to be used for generating the coded waveforms.

6. The multiplatform system of claim 5 wherein the transmission schedule is selected to provide a lesser amount of overlap between the coded waveforms transmitted by the nodes when the number of nodes is greater, and wherein the transmission schedule is selected to provide a greater amount of overlap between the coded waveforms transmitted by the nodes when the number of nodes is lower.

7. The multiplatform system of claim 6 wherein a family of codes having shorter lengths is selected when the multiplatform system includes a lesser number of nodes, and
wherein a family of codes having longer lengths is selected when the multiplatform system includes a greater number of nodes.

8. The multiplatform system of claim 3 wherein the transmission schedule is selected based on a channel quality of the netted data link.

9. The multiplatform system of claim 3 wherein the timing and scheduling circuitry of each node includes a clock, and
wherein the clocks of each node are synchronized prior to launch to provide for transmission of the coded waveforms at the one or more scheduled times in accordance with the selected transmission schedule.

10. The multiplatform system of claim 9 wherein the codes comprise pseudo-random codes of a family of related codes.

11. The multiplatform system of claim 10 wherein the coded waveforms are transmitted by the nodes at each of a plurality of scheduled times to allow each node to revise its trajectory and reset its navigational error on a regular basis.

12. The multiplatform system of claim 11 wherein a new set of codes of a selected family of codes is used to generate the coded waveforms for transmissions during each scheduled time.

13. The multiplatform system of claim 9 wherein the codes have a pseudo-random transec cover.

14. The multiplatform system of claim 2 wherein the netted data link comprises a network of data links established between the nodes to communicate data and telemetry with a master node,
wherein each of the nodes communicate information within designated time slots of the netted data link, and
wherein the nodes transmit the coded waveforms in accordance with the scheduled times during unused time slots of the netted data link.

15. A method for revising a trajectory and resetting a navigational error of a node operating in a multiplatform system comprising a plurality of nodes, the method comprising:
selecting a transmission schedule that identifies one or more scheduled times for transmission of a coded waveform;
transmitting the coded waveform in accordance with the transmission schedule for receipt by one or more of the other nodes;
correlating coded waveforms received from the other nodes to estimate a range to at least some of the other nodes, each node having a trajectory toward a target and a navigational error with respect to the trajectory; and
revising the trajectory based on the range estimates to the other nodes to avoid a possible collision with one or more of the other nodes; and
resetting the navigational error with respect to the revised trajectory.

16. The method of claim 15 wherein the nodes communicate over a netted data link,
wherein the scheduled times are selected to occur during unused time-slots on the netted data link, and
wherein the transmission schedule is selected to provide an amount of overlap between the coded waveforms transmitted by the nodes ranging from a same-time transmission schedule that provides full overlap of the coded waveform transmissions, to a partial overlapping transmission schedule that provides a partial overlap of the coded waveform transmissions, to a sequential transmission schedule that provides no overlap of the coded waveform transmissions.

17. The method of claim 16 further comprising selecting the transmission schedule based on a number of nodes of plurality and a length of the unused time-slots on the netted data link.

18. The method of claim 16 further comprising selecting the transmission schedule based on a channel quality of the netted data link.

19. The method of claim 16 further comprising selecting the transmission schedule based on a code length of a family of codes to be used for generating the coded waveforms.

20. The method of claim 19 wherein the transmission schedule is selected to provide a lesser amount of overlap between the coded waveforms transmitted by the nodes when the number of nodes is greater, and
wherein the transmission schedule is selected to provide a greater amount of overlap between the coded waveforms transmitted by the nodes when the number of nodes is lower.

21. The method of claim 20 further comprising:
selecting a family of codes having shorter lengths when the multiplatform system includes a lesser number of nodes; and
selecting a family of codes having longer lengths is selected when the multiplatform system includes a greater number of nodes.

22. A node configured to operate in a multiplatform system comprising a plurality of networked nodes that communicate over a netted data link, each node having a trajectory toward a target and a navigational error with respect to the trajectory, wherein the node comprises:
timing and scheduling circuitry to schedule transmission of a coded waveform at one or more scheduled times for receipt by one or more of the other nodes;
a parallel receiver to receive coded waveforms transmitted by one or more other nodes in accordance with a transmission schedule, the parallel receiver comprising a plurality of parallel correlators to correlate the coded waveforms received from the other nodes;
a range calculator to estimate a range to at least some of the other nodes based on the correlations; and
a navigational unit to revise the trajectory based on the range estimates to the other nodes to avoid a possible collision with one or more of the other nodes and to reset the navigational error with respect to the revised trajectory.

23. The node of claim 22 wherein each node further comprises a baseband modulator to modulate a selected code to generate a coded waveform at baseband for upconversion and transmission at the one or more scheduled times,
wherein the scheduled times are to occur during unused time-slots on the netted data link, and
wherein the timing and scheduling circuitry is configured to schedule transmission of a coded waveform at the one or more scheduled times during the unused time-slots.

24. The node of claim 22 wherein the transmission schedule is selected to provide an amount of overlap between the coded waveforms transmitted by the nodes of the plurality ranging from a same-time transmission schedule that provides full overlap of the coded waveform transmissions, to a partial overlapping transmission schedule that provides a partial overlap of the coded waveform transmissions, to a sequential transmission schedule that provides no overlap of the coded waveform transmissions.

25. The node of claim 24 wherein the transmission schedule is selected based on a number of nodes of plurality and a length of the unused time-slots on the netted data link.

26. The node of claim 24 wherein the transmission schedule is selected based on a channel quality of the netted data link.

27. The node of claim 24 wherein the transmission schedule is further selected based on a code length of a family of codes to be used for generating the coded waveforms.

28. The node of claim 27 wherein the transmission schedule is selected to provide a lesser amount of overlap between the coded waveforms transmitted by the nodes when the number of nodes is greater, and wherein the transmission schedule is selected to provide a greater amount of overlap between the coded waveforms transmitted by the nodes when the number of nodes is lower.

29. The node of claim 27 wherein a family of codes having shorter lengths is selected when the multiplatform system includes a lesser number of nodes, and wherein a family of codes having longer lengths is selected when the multiplatform system includes a greater number of nodes.

* * * * *